United States Patent

Mueller et al.

[11] 4,046,944
[45] Sept. 6, 1977

[54] FLUORINATED CONDENSATION POLYMERS AND THEIR USE AS SOIL RELEASE AGENTS

[75] Inventors: Karl Friedrich Mueller, New York; Robert A. Falk, New City, both of N.Y.

[73] Assignee: Ciba-Geigy Corporation, Ardsley, N.Y.

[21] Appl. No.: 674,188

[22] Filed: Apr. 6, 1976

[51] Int. Cl.$^2$ .................. B32B 27/04; C08G 18/50; D06M 15/68
[52] U.S. Cl. .................. 428/262; 260/29.2 TN; 260/77.5 AP; 252/8.8; 8/DIG. 11; 428/264; 428/425
[58] Field of Search ........ 260/77.5 AP, 858, 292 TN; 428/262, 264

[56] References Cited

U.S. PATENT DOCUMENTS

| | | | |
|---|---|---|---|
| 3,478,116 | 11/1969 | Smeltz | 260/77.5 AP |
| 3,547,894 | 12/1970 | Smeltz | 260/77.5 AP |
| 3,578,701 | 5/1971 | Smeltz | 260/537 S |
| 3,720,639 | 3/1973 | Griffith | 260/33.4 EP |
| 3,728,151 | 4/1973 | Sherman et al. | 428/272 |
| 3,759,874 | 9/1973 | Gresham | 260/77.5 AP |
| 3,870,748 | 3/1975 | Katsashima et al. | 260/77.5 AP |
| 3,872,058 | 3/1975 | Gresham | 260/77.5 AP |

*Primary Examiner*—H.S. Cockeram
*Attorney, Agent, or Firm*—Karl F. Jorda; Edward McC. Roberts; Prabodh I. Almaula

[57] ABSTRACT

Fluorinated condensation polymers which are made up of a combination of Blocks I and II:

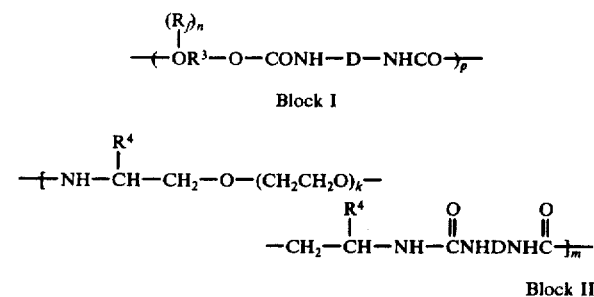

In these structures
$R_f$ is a branched or linear perfluoroalkyl or perfluorooxaalkyl group of 5–18 carbons,
$R^3$ is an aliphatic triradical of 2–50 carbon atoms selected from the group consisting of branched or straight chain alkylene, alkylenethioalkylene, alkyleneoxyalkylene and alkyleneiminoalkylene,
$R^4$ is hydrogen or methyl,
D is the organic divalent radial of a diisocyanate,
$k$ is 8–100,
$m$ is an integer of 1 to 5,
$n$ is 1 or 2, and
$p$ is an integer of 1 to 5,
wherein Blocks I and II are combined in a ratio of at least about 15% to 70% by weight of Block I to 30% to 85% by weight of Block II.

The blocks as defined are connected by urea linkages in the final product condensate. The polymer condensates of this invention are useful as coatings on textiles, glass, linoleum, leather, wood, tile, metals, plastics, and various materials. They are of particular use on textile materials as soil release agents, showing increased durability as compared to urethane-connected condensation block polymers.

20 Claims, No Drawings

FLUORINATED CONDENSATION POLYMERS AND THEIR USE AS SOIL RELEASE AGENTS

The treatment or modification of fabrics to improve their properties is routine practice in the textile industry. For instance, thermosetting organic resins are often used to impart "wash and wear" or "permanent press" characteristics to such fabrics as cotton, cotton/polyester blends and other cellulosic blends which naturally wrinkle badly when cleaned or laundered. Various modifying additives or finishing agents such as softeners, stiffeners, oil and water reppelents, etc., are also commonly employed with the resin to provide a suitable commercial fabric.

However, resin-treated durable press garments are difficult to clean because of their proneness to soil retention. Investigation of this phenomenon showed that resin treated cotton as well as the synthetic fibers are oleophilic and accordingly, dirt, particularly oily stains, clings tenaciously to the fabric substrate and is extremely difficult to remove under normal home washing conditions.

In an effort to overcome the soil removal resistance of resin-treated fabrics, artisans have commonly treated such fabrics with a hydrophilic colloid such as carboxymethylcellulose and synthetic polymers such as polyacrylic acid and copolymers of acrylic acid with lower alkyl acrylates and methacrylates. These materials, which are referred to as soil release agents, apparently coat the textile fibers with a hydrophilic film which allows the fibers to be wet effectively by detergent solutions so that the soils are readily removed by laundering.

The combination of oleophobic fluorinated groups and hydrophilic polyethyleneoxide containing groups in one polymer to achieve the release of oily stains from textiles has been described in U.S. Pat. No. 3,728,151. These polymers are prepared by free radical polymerization. The advantage of fluorinated soil release agents over non-fluorinated ones stems from their oleophobic nature, which (a) prevents the wicking of oily stains into the fabrics and (b) facilitates the lifting off of the staining material from the fabric when it is washed.

It has also been reported that certain fluorinated polyurethanes, with which the present invention is concerned, are useful soil release agents. Thus, French Pat. No. 1,546,627, dated Oct. 14, 1968, describes a soil release stain repellent composition based on a mixture of a fluorinated polymer, prepared from perfluoroalkylsulfamido- or carbamido-alkanols with aromatic diisocyanates, and a hydrophilic, fluorine-free polymer. A later French Pat. No. 1,562,070, of Feb. 24, 1969, is concerned with fluorinated soil-release agents which contain both, the fluorinated and hydrophilic portion, in the same polymer. The polymer are composed of "one or more segments containing an average of two or more dependent groups terminating in highly fluorinated aliphatic groups, and one or more segments of different kind each containing an average of more than two polar, i.e. hydrophilic, groups and sufficient organic structure to connect the segments. Individual segments may contain only one of either type group which are usually compensated for in the average by other segments possessing three or more such groups." The polymers are block or graft polymers as well as both.

The fluorinated aliphatic groups are held together in segments directly or through linkages made up of various combinations of functional groups and/or hydrocarbon chains.

The preferred combination of the hydrophilic segement is that based on polyoxyalkylene glycols. The molecular weight of the glycols may range from about 150 to 10,000 or more and may be repeated from 1 to 500 or more times.

Other $R_f$-polyurethanes, consisting of a combination of an oleophobic fluorine-containing block with a hydrophilic polyethyleneoxide block, and which are useful as soil release agents are described in U.S. Pat. No. 3,759,874, dated Sept. 18, 1973.

It has now been discovered that a great increase in performance, especially in durability of fluorochemical textile finishes, can be achieved by use of polymer condensates, wherein the oleophobic and hydrophilic blocks are connected by urea linkages rather than urethane linkages.

It is an object of this invention to provide a combination polymer comprising oleophobic fluorinated blocks and hydrophilic polyethyleneoxide blocks connected by urea linkages and having increases durability when applied to materials such as textiles.

The fluorinated condensation polymers of this invention are made up of a combination of Blocks I and II:

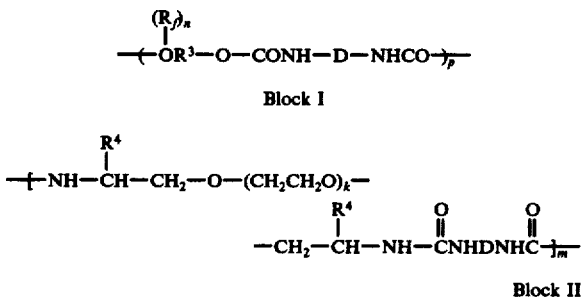

In these structures:

$R_f$ is a branched or linear perfluoroalkyl or perfluorooxaalkyl group of 5–18 carbons, $R^3$ is an aliphatic triradical of 2–50 carbon atoms selected from the group consisting of branched or straight chain alkylene, alkylenethioalkylene, alkyleneoxyalkylene and alkyleneiminoalkylene, $R^4$ is hydrogen or methyl, D is the organic divalent radical of a diisocyanate, $k$ is 8–100, $m$ is an integer of 1 to 5, and $n$ is 1 or 2, and $p$ is an integer of 1 to 5, wherein Blocks I and II are combined in a ratio of about 15% to 70% by weight Block I to 30% to 85% by weight of Block II.

It will be noted that the invention condensation polymers, being made up of Blocks I and II, are of the pattern:

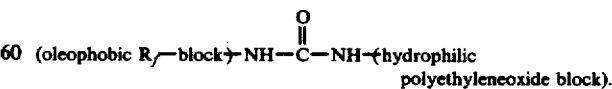

The molecular weight of Blocks I and II will vary, depending on the substituents and the number of repeating units in each. However, the advantages combination of Blocks I and II can be achieved by the use of monomer or prepolymer reactants so as to give 15–70% Block I to 30% to 85% Block II in the final polymer. As preferred compositional range is 30% to 60% Block I to 40% to 70% Block II.

In addition, the polycondensates of this invention may contain non-fluorinated, non-polyethylene-oxide-containing blocks of structure Block III

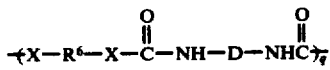

wherein D is as defined above,

X is oxygen or —NH—, $R^6$ is a hydrocarbon diradical of a diol or diamine, and which may be a linear or branched alkylene group of 3-20 carbon atoms, which may also contain unsaturation, alkyl or phenyl substituents as well as tert amino or carboxy group bearing substituents, and which may be interrupted by oxygen, sulfur or tert amino groups, and $q$ is 1-5.

Blocks of structure III may be present in the polycondensates of this invention in amounts ranging from 0-69%, but preferably less than 20%.

Block I is synthesized from a $R_f$-diol of the following structure

IV

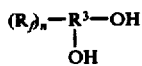

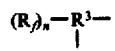

is the di-radical residue of diol IV where $R^3$ is a straight or branched chain alkylene of 2 to 12 carbon atoms, alkylene thioalkylene of 2 to 12 carbon atoms, alkylene oxyalkylene of 2 to 12 carbon atoms, and alkylene polyoxyalkylene, alkylene-iminoalkylene of 2 to 12 carbon atoms, where the nitrogen atoms contain as a third substituent hydrogen, lower alkyl or lower alkylene. Eligible $R_f$-diols of structure $R_f$—$R^3$—$(OH)_2$ are of the type described in the following U.S. Pat. No. 3,499,940, 3,578,701, 3,720,639, 3,759,874, 3,872,058 and 3,935,277.

Eligible $R_f$-diols of structure $(R_f)_n$—$R^3(OH)_2$ for use herein include:

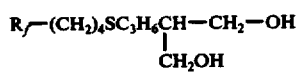

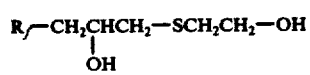

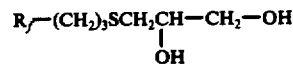

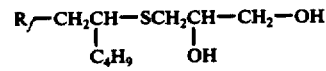

-continued

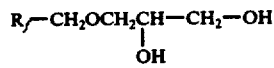

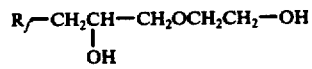

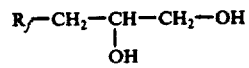

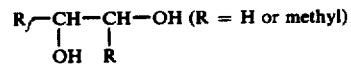

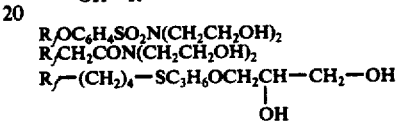

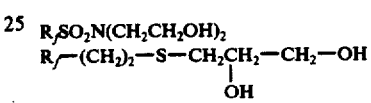

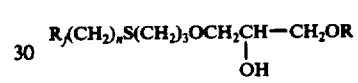

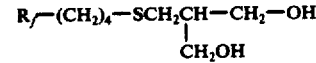

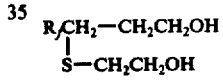

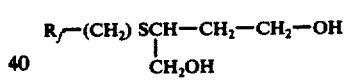

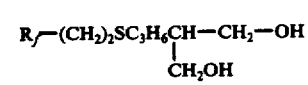

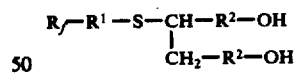

and

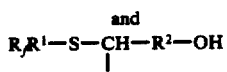

where $R^1$ is branched or straight chain alkylene of 1 to 12 carbon atoms, alkylenethio-alkylene of 2 to 12 carbon atoms, alkylene-oxyalkylene of 2 to 12 carbon atoms, or alkylene iminoalkylene of 2 to 12 carbon atoms, where the nitrogen atom contains as a third substituent hydrogen or alkyl of 1 to 6 carbon atoms, and $R^2$ is a straight or branched chain alkylene of 1 to 12 carbon atoms or an alkylene-polyoxyalkylene of formula $C_rH_{2r}(OC_sH_{2s})_t$, where $r$ is 1-12, $s$ is 2-6 and $t$ is 1-40.

A particularly preferred class of perfluoroalkyl substituted compounds contains the residue of an $R_f$-glycol characterized by the presence of perfluoroalkylthio groups on adjacent carbon atoms. This residue of the $R_f$-glycol has the structure:

$$-O-R^2-\underset{\underset{\underset{R_f}{R^1}}{S}}{CH}-\underset{\underset{\underset{R_f}{R^1}}{S}}{CH}-R^2-O-$$

wherein $R_f$ is perfluoroalkyl of 4 to 18 carbon atoms or said perfluoroalkyl substituted by perfluoroalkoxy of 2 to 6 carbon atoms, $R^1$ is straight or branched chain alkylene of 2 to 4 carbon atoms, and $R^2$ is a straight or branched chain alkylene of 1 to 4 carbon atoms or $C_rH_{2r}(OC_sH_{2s})_t$, wherein r is 1 to 4,
s is 2 to 4,
t is 1 to 4, and and $R_f$-glycol can be obtained by addition of 2.0 moles of a mercaptan of formula $R_f-R^1-SH$ to one mole of an acetylenic diol of formula $HOR^2-C\equiv C-R^2OH$, according to U.S. Pat. No. 3,935,277.

The most preferred $R_f$-glycol residues of the above structure are those where:

$R_f$ is perfluoroalkyl of 6 to 12 carbon atoms
$R^1$ is alkylene of 2 carbon atoms, and
$R^2$ is an alkylene of 2 carbon atoms, obtained by adding perfluoroalkylmercaptan to 2-butyn-1,4-diol.

These diols are synthesized by addition of $R_fR^1SH$ to butynediol in the presence of an azo type free radical catalyst such as azobisisobutyl-nitrile at a temperature of 60° to 80° C, in bulk or in the presence of a $C_6-C_{10}$ alkane solvent.

The $R_f$-diol is reacted with a diisocyanate to form a perfluoroalkyl substituted polyurethane prepolymer; suitable diisocyanates are:

1,2-ethylene diisocyanate;
1,6-hexylene diisocyanate;
lysine diisocyanate;
bis (2-isocyanatoethyl) fumarate;
1,4-cyclohexylene diisocyanate;
methylcyclohexylene diisocyanate;
2,2,4-trimethyl-1,6-hexylene diisocyanate;
2,6-toluene diisocyanate;
4,4'-diisocyanatodiphenyl ether;
4,4'-diisocyanatodiphenylmethane;
3,3'-dichloro-4,4'-diisocyanatodiphenylmethane;
4,4'-diphenyl diisocyanate;
4,4'-diisocyanatodibenzyl;
3,3'-dimethyl-4,4'-diisocyanatodiphenyl;
2,2'-dimethyl-4,4'-diisocyanatodiphenyl;
3,3'-dimethoxy-4,4'-diisocyanatodiphenyl;
2,2'-dichloro-5,5'-dimethoxy-4,4'-diisocyanatodiphenyl;
3,3'-dichloro-4,4'-diisocyanatodiphenyl;
1,3-diisocyanatobenzene;
1,4-diisocyanatobenzene;
1,2-naphthylene diisocyanate;
4-chloro-1,2-naphthylene diisocyanate;
4-methyl-1,2-naphthylene diisocyanate;
1,3-naphthylene diisocyanate;
1,4-naphthylene diisocyanate;
1,5-naphthylene diisocyanate;
1,6-naphthylene diisocyanate;
1,7-naphthylene diisocyanate;
1,8-naphthylene diisocyanate;
4-chloro-1,8-naphthalene diisocyanate;
2,3-naphthylene diisocyanate;
2,7-naphthylene diisocyanate;
1,8-dinitro-2,7-naphthylene diisocyanate;
1-methyl-2,4-naphthylene diisocyanate;
1-methyl-5,7-naphthylene diisocyanate;
6-methyl-1,3-naphthylene diisocyanate;
7-methyl-1,3-naphthylene diisocyanate;
dimer acid diisocyanate (DDI, General Mills); and isophorone diisocyanate.

Preferred diisocyanates are: isophorone diisocyanate, 2,2,4- or 2,4,4-trimethyl-1,6-hexane diisocyanate and 4,4'-diisocyanatodiphenylmethane.

Block II, which is typically synthesized in a second reaction step in the presence of and after the synthesis of Block I, consists predominantly of polyethylene oxide units within the general structure:

Block II $$\left[-NH-\underset{R^4}{CH}-CH_2-O-(CH_2CH_2O)_k-CH_2-\underset{R^4}{CH}-NH-\overset{O}{\overset{\|}{C}}NHDNH\overset{O}{\overset{\|}{C}}-\right]_m$$

wherein $R_f$ is a branched or linear perfluoroalkyl or perfluorooxaalkyl group of 5–18 carbons, $R^3$ is an aliphatic triradical of 2–50 carbon atoms selected from the group consisting of branched or straight chain alkylene, alkylenethioalkylene, alkylene oxyalkylene and alkyleneiminoalkylene, $R^4$ is hydrogen or methyl, D is the organic divalent radical of a diisocyanate, k is 8–100, m is an integer of 1 to 5. and p is in integer of 1 to 5.

Such diols include:

1,2-propane diol,
$HOCH_2CH_2 - S - CH_2CH_2OH$,
$HO - CH_2CH = CH - CH_2OH$,
$HO - CH_2CH_2CH_2CH_2OH$, $$HO-CH_2CH_2-\underset{\underset{CH_3}{|}}{N}-CH_2CH_2OH$$

$$HO-CH_2CH_2CHCH_2CH_2OH$$
(with pyridyl group attached)

polypropyleneoxide diol
poly-n-butyleneoxide diol

Typical di-secondary amines include:

$$\underset{\underset{CH_3CH_2}{|}}{HN}-CH_2CH_2-\underset{\underset{CH_2CH_3}{|}}{NH}$$

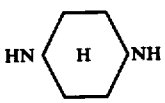

The preferred hydrophilic compounds for Block II are bis-2-aminopropylethers of polyethylene oxides with molecular weights of 800 to 2500.

When $m$ is 2 to 5, then Block II consists of several hydrophilic units as just described, connected by urea linkages.

It is within the scope of this invention to use as hydrophilic compounds bis-aminopropylethers of poly-ethoxylated diols or di-secondary amines.

If the block polycondensates of this invention contain segments of Block III, the block III segments are incorporated usually after synthesis of Block I, simultaneously with or subsequent to synthesis of Block II.

In the manufacture of Block III segments, the $R^6$-containing diol or diamine is preferably a diol or diamine containing a carboxy group or a tertiary amino group such as:
N-methyl-diethanol amine
N,N-bis(2-hydroxypropyl)aniline
N-methyl-di(3-aminopropyl)amine
1,4-bis(3-aminopropyl)piperazine or
di(hydroxymethyl)propionic acid.

Synthesis of the fluorinated polyurea-urethanes of this invention is carried out by reacting in an aprotic solvent a given $R_f$-substituted diol, an amino terminated polyethylene oxide compound and a diisocyanate in the appropriate ratios. Suitable solvents are aprotic solvents preferably with some water solubility, for example: ether, diethylene glycol dimethyl ether, N-methyl-pyrrolidone and sulfolane. Also useful are solvent mistures. Useful concentrations range from 10–70%. Preferably the synthesis is carried out in two steps: first, a fluorinated block is synthesized by condensing the $R_f$-diol with diisocyanate in such a ratio as to give a isocyanate terminated prepolymer, containing 1 to 5 $R_f$-diol units; second, the amino terminated polyethyleneoxide is added, with or without additional diisocyanate, but in amounts such that the ratio of $NCO/NH_2$ groups in the total charge is approximately 1. One can, of course, direct the reaction so that either amino or isocyanate end groups result, which in turn can be reacted with chain extenders, as is well known in polyurethane chemistry. For excess isocyanate such chain extenders are compounds with about two to four active hydrogens. No more than two active hydrogens may be attached to a single atom. Groups that contain active hydrogens include, —OH, —NH, —NH$_2$, —CO$_2$H, —CO$_2$NH$_2$, —SO$_2$NH$_2$ and —SH. Typical chain extending agents are water, hydrogen sulfide, ethylene glycol, ethylenediamine, 1,2-ethanedithiol, triethanolamine, 2,4-tolyenediamine and adipic acid. Diamines are preferred. The chain extending agents are used to increase the molecular weight of an isocyanate-containing polyurethane by coupling it with at least one other polyurethane. Usually at least 0.5 mole is used per mole of the isocyanate-containing polyurethane.

The resulting higher molecular weight polyurethane still containg unreacted isocyanate groups which may be reacted with isocyanate blocking agents or a cross-linking agent. It is also possible to react an amino terminated polymer with 2 moles of a tri-isocyanate, the resulting tetra-isocyanate prepolymer can be treated as described.

Excess isocyanate groups can also be blocked by reaction with certain blocking agents which will split off on heating, for instance during curing, and free the isocyanate group for cross-linking reaction on the fabric. The isocyanate blocking agent may be any one of those normally used to block isocyanates in urethane technology, for example: aryl alcohols, such as phenol, cresol, o- and p-nitrophenol, o- and p-chlorophenol, naphthol, 4-hydroxybiphenyl; oximes such as acetone oxime, butanone oxime; aryl mercaptans such as thiophenol; other organic active hydrogen compounds such as diethyl malonate, acetylacetone, ethyl acetonacetate, ethyl cyanoacetate, and eta-caprolactam; and inorganic compounds such as sodium bisulfite and hydroxylamine.

Excess isocyanate can also be reacted with ammonia to give urea end groups, which in turn can be methylolated either before or during the curing reaction, when formaldehyde is set free from methylolated cross-linking resins.

Excess amino groups can be reacted with anhydrides, such as maleic, succinic, phthalic or norborane anhydrides to give carboxy terminated polymers.

Synthesis of the fluorinated Block I is carried out in the presence of a catalyst, which may be preferably either a tertiary amine such as pyridine or triethylamine and the like, or a tin-organic catalyst such as di-butyltindilaurate, or a combination or both.

After the synthesis is completed, the 10–70% polymer solution is either used as is or adjusted with water or other solvents to any desired solid content. Such diluting solvents need not to aprotic and typically are alcohols or diols, such as 2-ethoxyethanol, di-ethylene glycol, butylcellsolve, dipropyleneglycol monomethyl ether or ethers like diethylcarbitol, diethylene glycol-dimethylether, and esters like methyl cellosolve acetate and ethylcellosolveacetate.

UTILITY

The condensation polymers of this invention are useful on substrates as coatings, which will (1) prevent, or at least reduce, soiling and (2) release soil when washed with water. They are therefore useful as ingredients in floor polishes, furnitur waxes, window washing fluids, and so on; their most important application is as a soil-release finish on textiles, especially polyester/cotton textiles. Generally, they are useful as coatings on glass, ceramics, masonry, wood, plastics, textiles, leather and metals, or as additive ingredients in such coatings.

APPLICATION

The AATCC water spray test rating was determined according to Standard Test method 22-1966 of the American Association of Textile Chemists and Colorists, XXXVII, 1961, 1952 (also designated ASTM-D-583-58). Ratings are given from 0 (minimum) to 100 (maximum).

The AATCC Oil Rating was determined according to Standard Test method 118-1966T of the American Association of Textile Chemists and Colorists. Ratings are given from 0 (minimum) to 8 (maximum). A commonly accepted level of repellency for oil repellent fabrics in the United States is an oil repellency of 4.

The novel polymers also show considerable fastness properties such as washfastness. They show excellent soil release properties, especially if hydrophilic monomer moieties are such as acrylic acid, methacrylic acid, vinyl pyrrolidone, polyethylene glycol dimethacrylic etc. are present in the novel polymers.

The soil release properties were determined according to AATCC Standard Test method 130-1969. Ratings are given from 1 (minimum) to 5(maximum).

The home washes were carried out in a Kenmore washing machine, Model 600, at 120° F, employing 45 g. of detergent "Tide XK" per washload.

All mentioned AATCC Texts listed in the Technical Manual of the American Association of Textile Chemists and Colorists, volume 46, edition 1970.

The novel polymers were applied to cotton fabric or polyester-cotton twill (65/35) in such a way that 0.04, 0.08 and 0.12% fluorine were deposited onto the fabric.

Polymers prepared in water or a water-solvent mixture or a solvent which is water-miscible were applied to polyester-cotton twill by padding from an aqueous pad bath containing also the following permanent press resin, catalyst and additives (so-called permanent press recipe):

4grams/liter acetic acid (50%)
 20 grams/liter isopropanol
 240 grams/liter dimethyl dihydroxyethylene urea
 40 grams/liter zinc nitrate catalyst
 0.16 F/liter fluorochemical
 pH adjusted to 4.5 with acetic acid - wet pick-up 50%

After the padding, the fabric is dried at 100° C for 2 minutes and cured at 163° C for 5 minutes.

The following Examples and Tables exemplify synthesis and compositions characteristic for the novel polymers.

Unless otherwise specified, in these Examples, $-R_f$ denotes a linear perfluoroalkyl group of 6 to 12 carbon atoms with the following chain length distribution:

| $C_6F_{13}-$ | 39% |
| $C_8F_{17}-$ | 35% |
| $C_{10}F_{27}-$ | 17% |
| $C_{12}F_{23}-$ | 8.7% |

$(R_f)_2$-diol denotes a diol of structure:

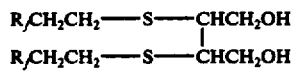

Jeffamine ED is the tradename for a family of bis-(2-aminopropy) ethers of polyethylene oxides with molecular weights ranging from 600-2000, available from Jefferson Chemical Corporation. The bis-(2-aminopropyl) ethers of polyethylene oxides used herein are referred to in the following Examples as BAPG, with the molecular weight designated as BAPG-900, BAPG-1000, etc.

In the following Examples, unless otherwise specified, percents are percent by weight.

EXAMPLE 1

A 300 ml 3-neck reaction flask equipped with stirrer, nitrogen inlet, condenser and thermometer was charged with 30 g. (0.03 mol) $(R_f)_2$-diol and 35 g. methylethyl ketone (MEK) which had been dried over molecular sieves. After all diol had dissolved, 4.4g. 3,3,4-trimethyl hexane-1,6-diisocyanate (TMDI) (0.02 mol) were added followed by 0.01 g. triethylamine. The mixture was heated to reflux for three hours, after which time not free -NCO groups were detectable by IR. Then another 4.4 g. TMDI were added, dissolved in 4.4 g. MEK followed after ¼ hour by 4.5 g. bis-2-aminopropyl ether or polyethylene glycol of MW 900 (BAPG-900) (0.05 mol) and 8.8 g. TMDI together with 54 g. MEK. The mixture was kept at reflux for b 4 more hours at which time no —NCO was detectable by IR. Heating was discontinued and 93 g. water were slowly added under vigorous stirring. A yellowish, slightly turbid solution resulted, whose content was ajusted to 25%

The polymer of this Example contains $(R_f)_2$-diol, diisocyanate and BAPG in a mol ratio of 3/8/5.

EXAMPLE 2

Using the same procedure as in Example 1, a polymer containing $(R_f)_2$-diol, TMDI, BAPG-900 and N-methyl-diethanol amine (NMDA) in the molar ratios of 3/9/5/1/ was prepared, by adding 1.19 g. (0.01 mol) NMDA and 2.2 g. (0.01 mol) TMDI with the last charge.

The product was a clear, slightly yellow solution, which could be further diluted with water.

EXAMPLE 3

Following the procedure of Example 2, the polymer containing the following molar amounts of reactants were prepared as 25% solutions:

| Example 3 | $(R_f)_2$-Diol | TMDI | BAPG | (MW) | NMDA |
|---|---|---|---|---|---|
| a | 3 | 6 | 2 | (2000) | 1 |
| b | 3 | 10 | 6 | (600) | 1 |
| c | 3 | 8 | 3 | (900) | 2 |
| d | 3 | 9 | 4 | (900) | 2 |
| e | 3 | 5 | 2 | (2000) | — |
| f | 3 | 6 | 3 | (2000) | — |
| g | 3 | 9 | 6 | (2000) | — |
| h | 3 | 9 | 7 | (2000) | — |
| i | 3 | 15 | 13 | (900) | — |
| k | 3 | 15 | 12 | (900) | — |

EXAMPLE 4

Following the procedure of Example 2, a polymer containing $R_f$-diol of structure.

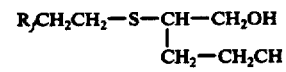

TMDI, BAPG-900 and N-methyl-diethanol-amine in molar ratios of 3:8:5 was prepared.

EXAMPLE 5

A 300 ml 3-neck reaction flask equipped with stirrer, nitrogen inlet, condenser and thermometer was charged with 30 g. (0.03 mol) $(R_f)_2$-diol and 35 g. methylethyl ketone (MEK), which had been dried over molecular sieves. After all diol had dissolved, 4,4g. 3,3,4-trimethyl hexane-1,6-diisocyanate (TMDI) (0.02 mol) were added followed by 0.01 g. triethylamine. The mixture was heated to reflux for three hours, after which time no free -NCO groups were detectable by IR. Then 11.8 g. (0.02 mol) Desmodur N-100 (a triisocyanate from Mobay Chemical Co.) were added, dissolved in 12 g. MEK followed after ¼ hour by 9 g. BAPG-900 (0.01 mol) and 9 g. MEK. The mixture was kept at reflux for 4 more hours. Heating was discontinued and 57 g. water were slowly added under vigorous stirring. A yellowish, slightly turbid solution resulted, whose solid content was adjusted to 25%.

EXAMPLE 6

A 300 ml 3-neck reaction flask equipped with stirrer, nitrogen inlet, condenser and thermometer was charged with 30 g. (0.03 mol) (R$_f$)$_2$-diol and 35 g. methylethyl ketone (MEK) which had been dried over molecular sieves. After all diol had dissolved, 4.4 g. 3,3,4-trimethyl hexane-1,6-diisocyanate (TMDI) (0.02 mol) were added followed by 0.01 g. triethylamine. The mixture was heated to reflux for three hours, after which time no free -NCO groups were detectable by IR. Then 11.8 g. (0.02 mol) Desmodur N-100 were added, dissolved in 12 g. MEK followed after ¼ hour by 36 g. BAPG-900 (0.04 mol) with 36 g. MEK. The mixture was kept at reflux for 4 more hours, no —NCO was detectable by IR. Heating was discontinued and 84 g. water were slowly added under vigorous stirring. A yellowish, slightly turbid solution resulted, whose solid content was adjusted with water to 25%.

EXAMPLE 7

A 300 ml 3-neck reaction flask equipped with stirrer, nitrogen inlet, condenser and thermometer was charged with 30 g. (0.03 mol) (R$_f$)$_2$-doil and 35 g. methylethyl ketone (MEK) which had been dried over molecular sieves. After all diol has dissolved, 4.4 g. 3,3,4-trimethyl hexane-1,6-diisocyanate (TMDI) (0.02 mol) were added followed by 0.01 g. triethylamine. The mixture was heated to reflux for three hours, after which time no free —NCO groups were detectable by IR. Then 4.4 g. TMDI were added, dissolved in 4.4 g. MEK followed after ¼ hour by 45 g. BAPG-900 (0.05 mol) and 6.6 g. TMDI together with 51 g. MEK. The mixture was kept at reflux for 4 more hours at which time no —NCO was detectable by IR. 11.8 g. (0.02 mol) Desmodur N-100 in 12 g. MEK were added and the mixture stirred at reflux for 1 hour. Heating was discontinued and the sample divided in 2 parts. Th one half 56 g. water were slowly added under vigorous stirring. A yellowish, slightly turbid solution resulted, whose solid content was adjusted to 25%. The other half was stored under dry nitrogen.

EXAMPLE 8

The polymers of Examples 1 to 7 were applied to cotton-polyester fabrics (0.08% F add-on) and cured according to the procedure given above in the "Application" section.

The results are tabulated below:

TABLE 1

| | AATCC Repellency Ratings | | | | Soil Release Ratings[1] | | | | | | MW of |
|---|---|---|---|---|---|---|---|---|---|---|---|
| | Initial | | After 1 Wash | | 1 Wash | | 5 Washes | | 10 Washes | | |
| Example | Oil | Water | Oil | Water | N | MO | N | MO | N | MO | BAPG |
| 1 | 4 | 70 | 3 | 70 | 5 | 3 | 4–5 | 2 | 4 | 4 | 900 |
| 2 | 4 | 50 | 3 | 50 | 4–5 | 2 | 3–4 | 2 | 3–4 | 3 | 900 |
| 3 | | | | | | | | | | | |
| 4 | 2 | 50 | 2 | 50 | 5 | 3 | 3–4 | 2 | 3 | | 900 |
| 5 | 4 | 70 | 4 | 70 | 4 | 2 | 4 | 2 | 3–4 | 3 | 900 |
| 6 | 3 | 70 | 1 | 70 | 3–4 | 2 | 3–4 | 2 | 3–4 | 2 | 900 |
| 7 | 3 | 70 | 1 | 50 | 3–4 | 2 | 3 | 1 | 3 | 2 | 900 |
| 3a | 3 | 70 | 2 | 70 | 4–5 | 3 | 3–4 | 2 | 3 | | 2000 |
| b | could not be applied due to precipitation | | | | | | | | | | 600 |
| c | 3 | 70 | 2 | 70 | 2 | 1 | 3 | 1 | 3 | | 900 |
| d | 4 | 70 | 4 | 70 | 5 | 3 | 3–4 | 2 | 3 | | 900 |
| e | 4 | 70 | 2 | 50 | 4 | 2 | 4 | 2 | 3 | 3 | 2000 |
| f | 4 | 70 | 2 | 50 | 5 | 4 | 3–4 | 2 | 3 | 2 | 2000 |
| g | 5 | 50 | — | — | 5 | 3 | 4 | 2 | 3 | | 2000 |
| h | 3 | 50 | — | — | 5 | 2 | 2 | 1 | 2 | | 2000 |
| i | 4 | 50 | — | — | 5 | 3 | 4 | 2 | 2 | | 900 |
| j | 4 | 50 | — | — | 5 | 3 | 4 | 2 | 2 | | 900 |
| Control | 0 | 0 | 0 | 0 | 3 | | 2–3 | 1 | 2 | 2 | — |

[1] N = Nujol
MO = Motor Oil

EXAMPLE 9

Example 2 was repeated, but N-methyl-diethanol amine was substituted with an equimolar amount of N-methyl-bis (3-amino-proyl)amine, (1.45 g. ), thus substituting urethane with more urea linkage groups.

EXAMPLE 10 a 500 ml 3-neck reaction flash equipped with stirrer, nitrogen inlet, condenser and thermometer was charged with 30 g. (0.03 mol) (R$_f$)$_2$-diol and 35 g. methylethyl ketone (MEK) which had been dried over molecular sieves. After all diol had dissolved, 4.4 g. 3,3,4-trimethyl hexane-1,6-diisocyanate (TMDI) (0.02 mol) were added followed by 0.01 g. triethylamine. The mixture was heated to reflux for three hours, after which time no free —NCO groups were detectable by IR. Then another 4.4 g. TMDI were added, dissolved in 4,4 g. MEK followed after ¼ hour by 36 g. BAPG-900 (0.04 mol) 17.6 g. TMDI, 6.8 g. dihydroxymethyl propionic acid together with 60 g. MEK. The mixture was kept at reflux for 4 more hours at which time no —NCO was detectable by IR. Heating was discontinued and 200 g. water were slowly added under vigorous stirring. A clear solution resulted, whose solid content was adjusted to 25%.

EXAMPLE 11

Example 10 was repeated, but using BAPG of molecular weight of 2000 instead of 900.

EXAMPLE 12

A 500 ml 3-neck reaction flask equipped with stirrer, nitrogen inlet, condenser and thermometer was charged with 30 g. (0.03 mol) (R$_f$)$_2$-diol and 35 g. methylethyl ketone (MEK) which had been dried over molecular sieves. After all diol had been dissolved, 4.4 g. 3,3 4-trimethyl hexane-1,6-diisocyanate (TMDI) (0.02 mol) were added followed by 0.01 g. triethylamine. The mixture was heated to reflux for three hours, after which time no free —NCO groups were detectable by IR. Then another 4.4 g. TMDI were added, dissolved in 4.4 g. MEK followed after ¼ hour by 80 g. BAPG-2000 (0.04 mol), 22 g. TMDI, 6.8 g. dihydroxypropionic acid, and 5.4 g. N-methyl-bis-3-aminopropyl amine (0.04 mol) together with 115 g. MEK. The mixture was kept at reflux for 4 more hours at which time no —NCO was detectable by IR. Heating was discontinued and 300 g. water were slowly added under vigorous stirring. A clear solution resulted, whose solid content was adjusted to 25%.

EXAMPLE 13

Example 1 was repeated, but BAPG-900 was replaced with polyethylene oxide of MW 1000.

EXAMPLE 14

Example 4 was repeated, but BAPG 900 was replaced with polyethylene oxide of MW 1000.

EXAMPLE 15

The polymers of Examples 1, 4 and 9 were tested for their dirt-releasing efficiency versus polymers of Examples 13, 14 and 2, which contain fewer urea-linkage groups. The results are shown in Table 2 below, clearly demonstrating the superiority of urea linkages over urethane linkages.

TABLE 2

| Polymer of Example | AATCC Repellency Ratings | | | | Soil Release Ratings After | | | | | Ratio of Urea/Urethane Linkages |
|---|---|---|---|---|---|---|---|---|---|---|
| | Initial | | 1 Wash | | 1 Wash | | 5 Washes | | 10 Washes | |
| | Oil | Water | Oil | Water | N | MO | N | MO | N | |
| 1 | 4 | 50 | 2 | 50 | 5 | 2 | 3 | 1 | 3 | 5/3 |
| 13 | 2 | 0 | 1 | 0 | 4 | 1 | 3 | 1 | 2 | 0/8 |
| 4 | 2 | 50 | 2 | 50 | 5 | 3 | 3-4 | 1 | 3 | 5/3 |
| 14 | 0 | 0 | 0 | 0 | 1-2 | 1 | 1-2 | 1 | 2 | 0/8 |
| 9 | 4 | 50 | 3 | 50 | 5 | — | 4-5 | — | 4 | 6/3 |
| 2 | 4 | 70 | 3 | 70 | 5 | — | 3-4 | — | 2 | 5/4 |

N = Nujol
MO = Motor Oil

EXAMPLE 16

A 500 ml 3-neck flask equipped with stirrer, nitrogen inlet, condenser and thermoregulator was charged with 30 g. (0.03 mol) (R$_f$)$_2$-diol and 40 g. methylethyl ketone (MEK), which had been dried over molecular sieves. After all diol had dissolved, 5.75 g. diphenylmethane-4,4'-diisocyanate (0.02 mol) were added following by 0.005 g. methylamine. The mixture was heated to reflux for two hours, after which time no free —NCO groups were detectable by IR. The solution was cooled to room temperature and 5.75 g. (0.02 mol) diphenylmethane-4,4'-diisocyanate were added together with 80 g. MEK, followed by 59 g. bis-2-aminopropyl ether of polyethyleneoxide (MW 980) (0.06 mol) and 11.1 g. (0.05 mol) isophorone-diisocyanate. The mixture was stirred at 55° C for four hours, after which time a remaining trace of NCO, as determined by IR, was reacted with 0.1 g. methyl-bis(3-aminopropyl)amine. The clear, viscous solution was cooled to room temperature and 200 g. water were slowly stirred in to give a clear, yellow 25.5% solution of the product, which could be further diluted with water.

The polymers of Examples 10-12 and 16 were applied to cotton/polyester fabric as described in the section entitled "Application" at 0.08% F add-on, and gave the following results:

| Polymer of Example | AATCC Repellency | | Soil Release Nujol | |
|---|---|---|---|---|
| | Oil | Water | 1 Wash | 5 Washes |
| 10 | 3 | 50 | 5 | 3-4 |
| 11 | 2 | 0 | 4.5 | 3-4 |
| 12 | 2 | 0 | 4 | 3 |
| 16 | 2 | 50 | 4.5 | 3 |

What is claimed is:

1. A fluorinated condensation polymer having a chemical structure containing the units

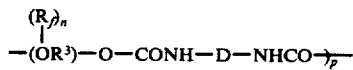

and

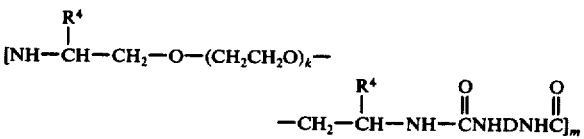

in the ratio of 15-70% by weight of the fluorinated units to 30-85% by weight of the non-fluorinated polyethyleneoxide units, wherein $R_f$ is a branched or linear perfluoroalkyl or perfluorooxyalkyl group of 5-18 carbons, $R^3$ is an aliphatic triradical of 2-50 carbon atoms selected from the group consisting of branched or straight chain alkylene, alkylenethioalkylene, alkyleneoxyalkylene and alkyleneiminoalkylene, $R^4$ is hydrogen or methyl, D is the organic divalent radical of a diisocyanate, k is 8-100, m is an integer of 1 to 5, n is 1 or 2, and p is an integer of 1 to 5.

2. A fluorinated condensation polymer having a chemical structure containing the units

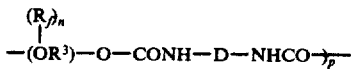

and

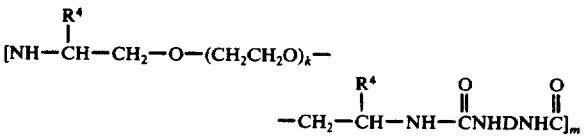

in the ratio of 15-70% by weight of the fluorinated units to 30-85% by weight of the non-fluorinated polyethyleneoxide units, wherein n is 1, $R^4$ is hydrogen or methyl, D is the organic divalent radical of a diisocyanate, $k$ is 8-100, $m$ is an integer of 1 to 5, $p$ is an integer of 1 to 5, and

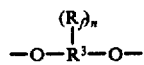

is the residue of a fluorinated diol of the formula $R_fR^3(OH)_2$ selected from the group consisting of:

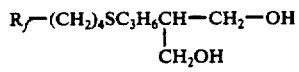

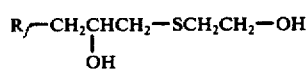

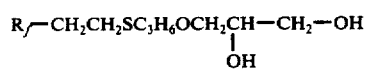

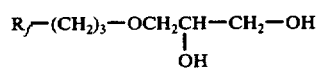

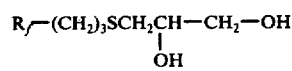

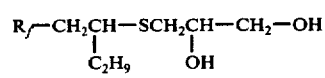

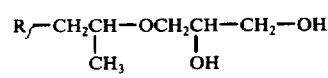

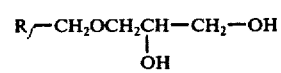

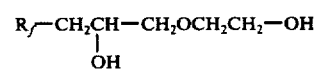

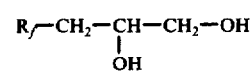 (R = H or methyl)

$R_fOC_6H_4SO_2H(CH_2CH_2OH)_2$ $R_fCH_2CON(CH_2CH_2OH)_2$

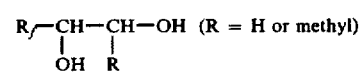

$R_fSO_2N(CH_2CH_2OH)_2$

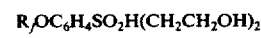

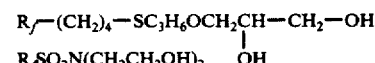

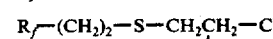

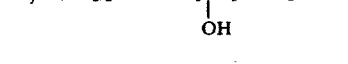

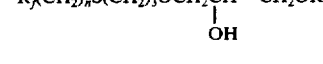

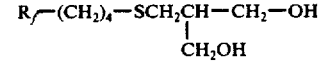

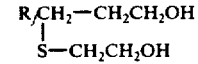

-continued

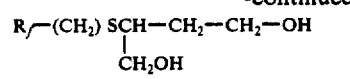

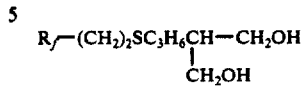

and

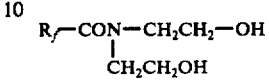

3. The polymer of claim 1, wherein

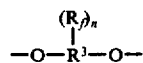

is the residue of a fluorinated diol of the formula $(R_f)_nR^3(OH)_2$ selected from the group consisting of:

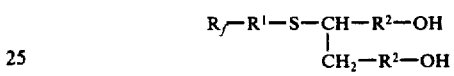

and

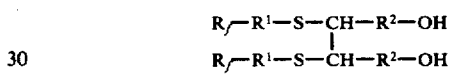

wherein $R^1$ is a branched or straight chain alkylene of 1 to 12 carbon atoms and $R^2$ is a straight or branched chain alkylene of 1 to 12 carbon atoms or an alkylene-polyoxyalkylene of formula $C_rH_{2r}(OC_sH_{2s})_t$, where $r$ is 1-4, $s$ is 2-4 and $t$ is 1-4.

4. The polymer of claim 3, wherein $(R_f)_nR^3(OH)_2$ is of the formula, with $n = 2$:

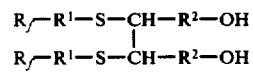

where $R^1$ is —$C_2H_4$— and $R^2$ is —$CH_2$—.

5. The polymer of claim 1, wherein $(R_f)_nR^3(OH)_2$ is of the formula, with $n = 1$:

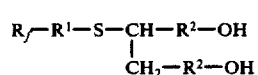

where $R^1$ is —$C_2H_4$— and $R^2$ is —$CH_2$—.

6. The polymer of claim 1, wherein $k$ is 12-50.

7. The polymer of claim 3, wherein $k$ is 12-50.

8. The polymer of claim 4, wherein $k$ is 15-25.

9. The polymer of claim 5, wherein $k$ is 15-25.

10. The polymer of claim 1, wherein $R_f$ is linear perfluoroalkyl of 6-12 carbon atoms.

11. The polymer of claim 10, wherein the ratio of fluorinated units to non-fluorinated polyethyleneoxide units is in the range of 30-60% to 40-70% by weight.

12. The polymer of claim 1, wherein D is selected from the group consisting of $$-CH_2-CH_2-\underset{CH_3}{\underset{|}{C}}-\underset{CH_3}{\underset{|}{CH}}-CH_2-CH_2-$$

[structure: -CH₂- attached to trimethylcyclohexane ring]

[structure: diphenylmethane -⌬-CH₂-⌬-]

13. The polymer of claim 12, wherein $(R_f)_n R^3(OH)_2$ is of the formula, with $n = 2$:

$$R_f-R^1-S-\underset{R_f-R^1-S-CH-R^2-OH}{CH-R^2-OH}$$

wherein $R^1$ is —$C_2H_4$— and
$R^2$ is —$CH_2$—, wherein $k$ is 15 and 25 and wherein the ratio of fluorinated units to non-fluorinated polyethyleneoxide units is in the range of 30–60% to 40–70% by weight.

14. The polymer of claim 1, further containing units of the structure $$-(X-R^6-X-\overset{O}{\overset{\|}{C}}-NH-D-NH\overset{O}{\overset{\|}{C}})_q-$$

wherein

X is oxygen or —NH—, $R^6$ is linear or branched alkylene group of 3–20 carbon atoms which is unsubstituted or is substituted with a tert-amino group or a carboxy group, a linear or branched alkyleneoxyalkylene of 3–20 carbon atoms, a linear or branched alkylenethioalkylene group of 3–20 carbon atoms, or a linear or branched alkylenetert-iminoalkylene group of 3–20 carbon atoms, $q$ is 1 to 5, and D is the organic divalent radical of a diisocyanate.

15. The polymer of claim 14, wherein
X is oxygen and $$D \text{ is } -CH_2CH_2-\underset{CH_3}{\underset{|}{N}}-CH_2CH_2-,$$

$$-CH_2CH_2CH_2-\underset{\text{[phenyl]}}{\underset{|}{N}}-CH_2CH_2CH_2-, \text{ or}$$

$$-CH_2-\underset{CH_3}{\overset{COOH}{\underset{|}{\overset{|}{C}}}}-CH_2-,$$

or wherein
X is —NH— and $$D \text{ is } -CH_2CH_2CH_2-\underset{CH_3}{\underset{|}{N}}-CH_2CH_2CH_2- \text{ or}$$

$$-CH_2CH_2CH_2-N\underset{CH_2CH_2}{\overset{CH_2CH_2}{\diagdown\diagup}}N-CH_2CH_2CH_2-.$$

16. A composition comprising water and 10 to 60% of a fluorinated condensation polymer having a chemical structure containing the units $$-(OR^3)\underset{|}{\overset{(R_f)_n}{-}}O-CONH-D-NHCO\overset{}{)_p}-$$

and $$[NH-\underset{R^4}{\underset{|}{CH}}-CH_2-O-(CH_2CH_2O)_k-$$

$$-CH_2-\underset{R^4}{\underset{|}{CH}}-NH-\overset{O}{\overset{\|}{C}}NHDNH\overset{O}{\overset{\|}{C}}]_m$$

in the ratio of 15–70% by weight of the fluorinated units to 30–85% by weight of the non-fluorinated polyethyleneoxide units, wherein $R_f$ is a branched or linear perfluoroalkyl or perfluorooxyalkyl group of 5–18 carbons, $R^3$ is an aliphatic triradical of 2–50 carbon atoms selected from the group consisting of branched or straight chain akylene, alkylenethioalkylene, alkyleneoxyalkylane and alkyleneiminoalkylene, $R^4$ is hydrogen or methyl, D is the organic divalent radical of a diisocyanate, $k$ is 8–100, $m$ is an integer of 1 to 5, $n$ is 1 or 2, and $p$ is an integer of 1 to 5.

17. The composition of claim 16, wherein $(R_f)_n R^3(OH)_2$ is of the formula, with $n = 2$:

$$R_f-R^1-S-CH-R^2-OH$$
$$R_f-R^1-S-\underset{|}{CH}-R^2-OH$$

wherein $R^1$ is —$C_2H_4$— and $R^2$ is —$CH_2$—, wherein $k$ is 15 to 25 and wherein the ratio of fluorinated units to non-fluorinated polyethyleneoxide units is in the range of 30–60% to 40–70% by weight.

18. The composition according to claim 17, further comprising a water-miscible organic solvent.

19. A process of treating textiles, comprising the step of applying to a textile a composition comprising water and 10 to 60% of a fluorinated condensation polymer having a chemical structure containing the units $$-(OR^3)\underset{|}{\overset{(R_f)_n}{-}}O-CONH-D-NHCO\overset{}{)_p}-$$

and $$[NH-\underset{R^4}{\underset{|}{CH}}-CH_2-O-(CH_2CH_2O)_k-$$

$$-CH_2-\underset{R^4}{\underset{|}{CH}}-NH-\overset{O}{\overset{\|}{C}}NHDNH\overset{O}{\overset{\|}{C}}]_m$$

in the ratio of 15–70% by weight of the fluorinated units to 30–85% by weight of the non-fluorinated polyethyleneoxide units, wherein $R_f$ is a branched or linear perfluoroalkyl or perfluorooxyalkyl group of 5–18 carbons, $R^3$ is an aliphatic triradical of 2–50 carbon atoms selected from the group consisting of branched or straight chain alkylene, alkylenethioalkylene, alkyleneoxyalkylane and alkyleneiminoalkylene, $R^4$ is hydrogen or methyl, D is the organic divalent radical of a diisocyanate, $k$ is 8–100, $m$ is an integer of 1 to 5, $n$ is 1 or 2, and $p$ is an integer of 1 to 5.

20. A soil-releasing textile, consisting essentially of textile fibers coated with a fluroinated condensation polymer having a chemical structure containing the units

and

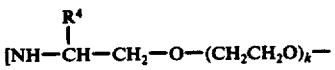
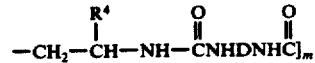

in the ratio of 15–70% by weight of the fluorinated units to 30–85% by weight of the non-fluorinated polyethyleneoxide units wherein $R_f$ is a branched or linear perfluoroalkyl or perfluorooxyalkyl group of 5–18 carbons, $R^3$ is an aliphatic triradical of 2–50 carbon atoms selected from the group consisting of branched or straight chain akylene, alkylenethioalkylene, alkyleneoxyalkylane and alkyleneiminoalkylene, $R^4$ is hydrogen or methyl, D is the organic divalent radical of a diisocyanate, $k$ is 8–100, $m$ is an integer of 1 to 5, $n$ is 1 or 2, and $p$ is an integer of 1 to 5.

* * * * *